Oct. 16, 1934.    C. J. HELM    1,976,725
DISTRIBUTOR
Filed Oct. 7, 1930
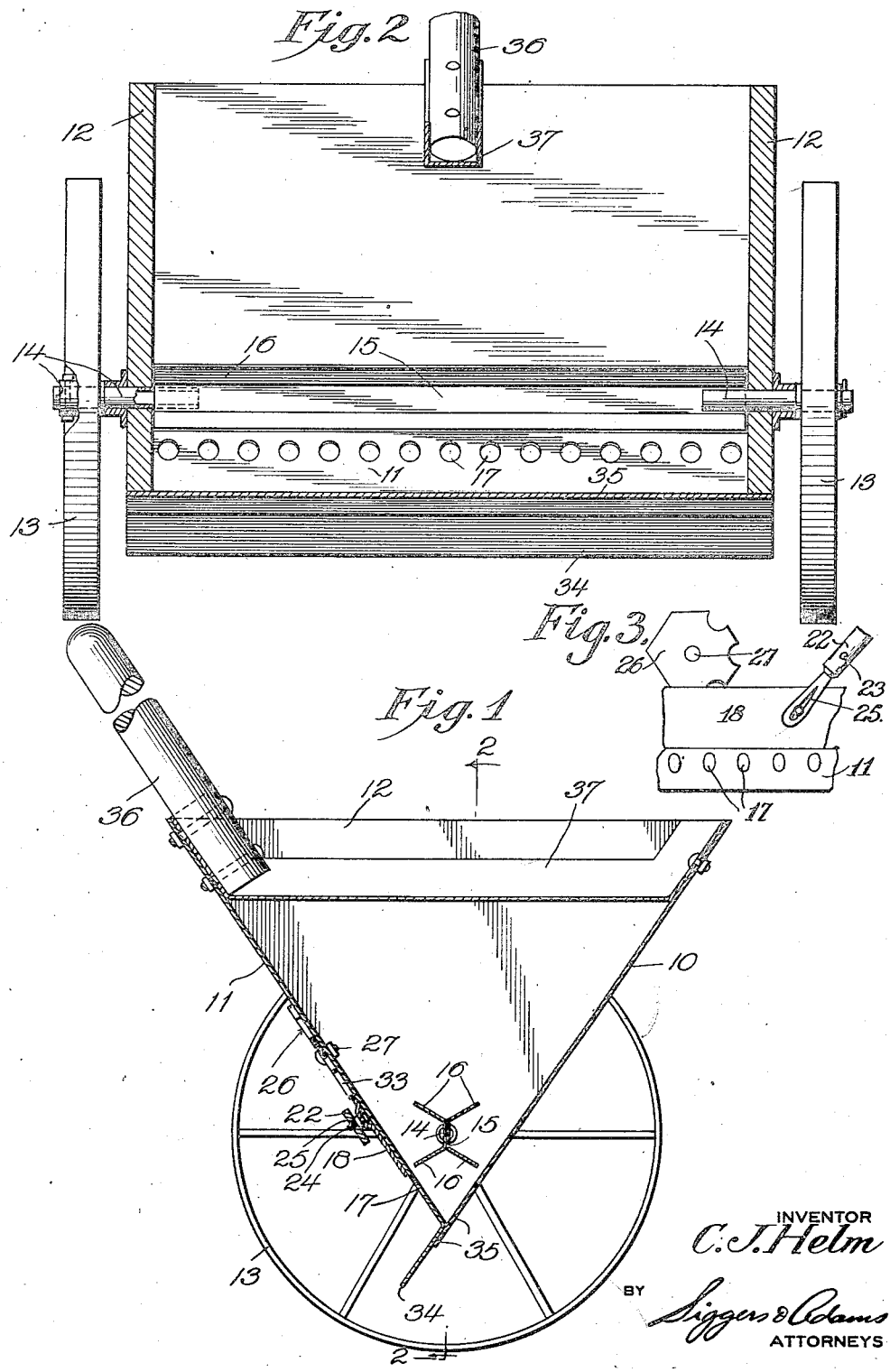

Patented Oct. 16, 1934

1,976,725

UNITED STATES PATENT OFFICE 1,976,725

DISTRIBUTOR

Charles J. Helm, Ypsilanti, Mich., assignor to O. E. Thompson & Sons, Ypsilanti, Mich., a corporation of Michigan Application October 7, 1930, Serial No. 487,069

4 Claims. (Cl. 275—2)

This invention relates to distributors for fertilizers and other loose fluent materials and, among other objects, aims to provide a distributor of very simple construction which may be economically manufactured and which is entirely satisfactory for the distribution of a wide variety of materials.

In the accompanying drawing forming a part of this specification, and showing a preferred embodiment of the invention, Fig. 1 is a vertical sectional view;

Fig. 2 is a vertical longitudinal section substantially on the line 2—2 of Fig. 1;

Fig. 3 is a detail view of the feed regulating means.

Referring particularly to the drawing, there is shown a hopper preferably of galvanized sheet metal having a front longitudinal wall 10, a rear longitudinal wall 11 and two end walls 12. These end walls may be of wood or of metal.

To support the hopper and permit travel over the surface of the ground, a pair of wheels 13 are provided, said wheels being secured to stub axles 14 rotatable in bearings on the end walls 12 of the hopper. The stub axles 14 extend into the hopper only a short distance and are secured to a combined feeder and agitator or mixer, as best shown in Fig. 2. Preferably the ends of the stub axles are slit longitudinally, both axles being preferably pipe sections which will facilitate the slitting and will contribute to lightness and economy of manufacture. The combined feeder and mixer consists of two like strips of sheet metal 15, each substantially U-shaped in cross section, the two strips being united as by welding and being passed into the slits at the ends of the stub axles, the stub axles then being united to them as by welding or soldering.

The utilization of two sheets of strip metal as the body of the combined feeder and mixer, represents a real economy because the metal strips may be waste products formed during the process of manufacturing the hopper body. These strips are initially plane and are easily bent by a simple manufacturing operation into the form shown in the drawing. When the strips have been assembled and united, they provide four outwardly projecting vanes 16 which provide agitator means stirring up the material in the hopper and also means for feeding the material out through a series of openings 17 provided near the bottom of the hopper in one wall thereof.

While a series of round openings 17 has been shown, in handling certain materials I may prefer a single continuous longitudinally extending slot for the discharge of the materials from the hopper. Such a slot would bear the same relationship to the other parts of the hopper as the series of openings 17 although it might have a width somewhat less than the diameter of the individual openings.

In order to control the discharge of the material through the opening or openings 17, a valve member is provided, said member being preferably formed of a flat plate 18 movably mounted on the outside of the hopper above the openings. Thus when the valve member is moved by a lever 22, it slides downwardly to close or partly close the opening 17, thereby regulating the discharge.

The lever 22 is pivoted, as at 23, upon the wall 11 of the hopper and has a pin and slot connection 24, 25 at its lower end with the valve member. If desired, the upper end of the lever 22 may have a dog or detent (not shown) which may engage with a toothed quadrant (not shown) fixed to the hopper wall. This will be understood, without illustration.

To provide for precise control of the position of the valve with respect to the openings, an abutment member 26 in the form of a rotary "star wheel" is mounted on a pin 27 on the hopper immediately above the valve 18. The star wheel is so positioned that its periphery has edge to edge contact with the upper edge of the valve member 18.

The material discharged through the opening 17 is preferably dropped upon a scatter board 34 which preferably is integral with the hopper wall 11 extending below the bottom of the hopper substantially at right angles to the wall 11. The material forced outwardly through the holes 17 drops upon the scatter board and is distributed over the surface of the ground in a substantially even, unbroken "ribbon". The scatter board 34 is preferably welded to an extension 35 of the hopper wall 10, said extension projecting below the point where the walls 10 and 11 meet at the bottom of the hopper. Thus a rigid reinforcement is provided lengthwise of the hopper and leakage of the material at the bottom joint is made impossible.

The described distributor is designed to be pushed by the operator over the surface of the ground and hence is provided with a handle 36. For convenience of illustration, a straight handle is shown but in many instances it will be desired to employ other forms of handles unnecessary to describe or illustrate. So as to strengthen the top of the hopper and transmit the thrust from the handle to the hopper without any tendency to buckle the walls of the hopper or loosen the connection of the handle with the hopper, a brace 37 is provided, said brace being preferably a channel bar as shown, the channel bar having upturned ends secured by bolts or rivets with the upper edges of the walls 10 and 11. Preferably one end of the channel 37 is interposed between the lower end of the handle and the wall 11 so that the connection of the handle with said wall is strengthened.

The described distributor is useful for spreading such materials as fertilizer, lime, calcium, chloride, sand and salt, as well as grass and other seeds. It can be adjusted to handle such materials and to feed the same either fast or slowly, regardless of the amount of material in the hopper. The construction of the distributor is so very simple that it will not get out of order and will be serviceable for a long period of time.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In a distributor for fertilizers and other fluent materials, the combination of a hopper; wheels supporting the hopper; a handle secured to the top of the hopper; and a brace extending crosswise of the hopper at the top thereof and secured at both ends to the hopper midway the length thereof; the parts being arranged so that the sides of the hopper resist buckling arising from the thrust of the handle.

2. In a distributor for fertilizers and other fluent materials, the combination of a hopper; wheels supporting the hopper; a handle secured to the top of the hopper; and a channel member secured to the handle and lying between it and the hopper and extending crosswise of the hopper to the other side and there secured.

3. In a distributor for fertilizers and other fluent materials, a hopper having downwardly converging side walls meeting at the bottom, and two end walls; one of the side walls having openings near its lower end and being bent substantially at right angles below said openings to provide a scatter board integral with the hopper; the other side wall being secured to and lying underneath the angularly bent portion of the first side wall.

4. In a distributor for fertilizers and other fluent materials, the combination of a hopper having discharge openings; a pair of wheels fixed on stub axles at the opposite ends of the hopper; and a combined feeder and mixer secured to both stub axles and extending between them near the bottom of the hopper to rotate synchronously with the wheels.

CHARLES J. HELM.